(12) United States Patent
Cuddihy et al.

(10) Patent No.: US 12,172,551 B2
(45) Date of Patent: Dec. 24, 2024

(54) INFRARED SENSOR OBJECT DETECTION

(71) Applicant: Ford Global Technologies, LLC, Dearborn, MI (US)

(72) Inventors: Mark A. Cuddihy, New Boston, MI (US); Kevin Pline, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 624 days.

(21) Appl. No.: 17/206,549

(22) Filed: Mar. 19, 2021

(65) Prior Publication Data
US 2022/0297575 A1    Sep. 22, 2022

(51) Int. Cl.
| *B60R 22/00* | (2006.01) |
| *B60N 2/02* | (2006.01) |
| *G01S 17/04* | (2020.01) |
| *G01S 17/08* | (2006.01) |

(52) U.S. Cl.
CPC ............ *B60N 2/0244* (2013.01); *G01S 17/04* (2020.01); *G01S 17/08* (2013.01)

(58) Field of Classification Search
CPC ........ B60N 2/0244; G01S 17/04; G01S 17/08
See application file for complete search history.

(56) References Cited

U.S. PATENT DOCUMENTS

| 7,379,389 | B2 | 5/2008 | Aikyo et al. | |
| 7,852,462 | B2* | 12/2010 | Breed | B60W 30/095 |
| | | | | 356/28 |
| 10,718,882 | B2* | 7/2020 | Yoon | G06F 1/3215 |
| 2006/0284587 | A1* | 12/2006 | Teshima | B60N 2/06 |
| | | | | 318/567 |
| 2022/0219570 | A1* | 7/2022 | Ohno | B60N 2/06 |

FOREIGN PATENT DOCUMENTS

| CN | 110155207 | A | 8/2019 |
| CN | 111310577 | A | 6/2020 |
| EP | 3279691 | A1 | 2/2018 |
| FR | 2987452 | B1 | 10/2020 |

\* cited by examiner

*Primary Examiner* — Adam M Alharbi
(74) *Attorney, Agent, or Firm* — Frank A. MacKenzie; Bejin Bieneman PLC (57) ABSTRACT

A system includes a computer including a processor and a memory. The memory stores instructions executable by the processor to receive a reflection magnitude from an infrared sensor during a movement of an object relative to the infrared sensor, to determine a change of the reflection magnitude, and to detect the object based on comparing the determined change of the received reflection magnitude to a change threshold.

18 Claims, 6 Drawing Sheets

INFRARED SENSOR OBJECT DETECTION

BACKGROUND

An infrared sensor can detect a magnitude of infrared light received from a sensor field of view. An active infrared sensor transmits infrared light to the field of view of the sensor and can detect reflections of the transmitted infrared light from an object within the sensor field of view. However, there can be limitations with using an active infrared sensor for object detection.

DETAILED DESCRIPTION

Introduction

Disclosed herein is a system including a computer programmed to receive a reflection magnitude from an active infrared sensor during a movement of an object relative to the infrared sensor, to determine a change of the reflection magnitude, and to detect an object based on comparing the determined change of the received reflection magnitude to a change threshold. Because the magnitude of infrared light reflected from an object is not only based on a distance of the sensor from the object but also a reflectivity of an object surface material, an accuracy of an active infrared sensor can be improved by accounting for a change of reflection magnitude with respect to a distance between the sensor and the object. Using only magnitude of reflectivity for object detection can result in failing to detect or incorrectly detecting an object because a magnitude of a reflection can be highly dependent on a reflectivity of a material of the object, whereas a change of reflectivity (i.e., magnitude of reflection) based on a change of distance from a sensor to an object is typically independent of the material of the object. Thus, a change of reflectivity based on a change of distance can be determined when the distance of the sensor to an object is changing, and can thereby be used to detect the object. The system can be implemented in environments utilizing infrared sensing including, in examples discussed herein, in a vehicle.

The instructions may further include instructions to detect the object upon determining that the determined change exceeds the threshold.

The instructions may further include instructions to apply a filter to the determined change of the reflection magnitude, wherein the object is detected based on a filtered change.

The instructions may further include instructions to determine the change threshold based on a distance threshold, and detect the object upon determining that the determined change exceeds the change threshold.

The instructions may further include instructions to receive a second reflection magnitude from a second infrared sensor, wherein the infrared sensor and the second infrared sensor are mounted to a platform; to determine a second change of the second reflection magnitude; and to determine a location of the detected object relative to the platform based on the determined change and the second change.

A second computer associated with the infrared sensor may be programmed to receive the second reflection magnitude from the infrared sensor and determine the location of the object relative to the platform.

The instructions may further include instructions to determine, based on a path of a platform and the determined location of the object, that the object is in the path of the platform, wherein the infrared sensor is mounted to the platform and wherein a field of view of the infrared sensor at least in part includes the path of the platform; and upon determining that the object is in the path of the platform, actuate an actuator to stop the platform.

The instructions may further include instructions to actuate a vehicle seat actuator to move a vehicle seat within a vehicle interior compartment, wherein (i) the infrared sensor is mounted to the vehicle seat having a field of view including a path of the vehicle seat and (ii) the vehicle seat actuator is mechanically connected to the vehicle seat.

The instructions may further include instructions to actuate the infrared sensor to transmit infrared light and determine the reflection magnitude based on reflections of the transmitted infrared light.

The infrared sensor may be mounted to a platform, and the instructions may further include instructions to activate the infrared sensor upon actuating an actuator to move the platform.

The instructions may further include instructions to determine a distance of the infrared sensor to the object based on the determined change of the received reflection magnitude; to actuate an actuator to move a platform with a first speed upon determining that the distance is greater than a deceleration distance threshold; to actuate the actuator to move the platform with a second speed less than the first speed upon determining that the distance is less than the deceleration distance threshold and greater than a distance threshold; and to actuate the actuator to stop the platform upon determining that the distance is less than the distance threshold.

Further disclosed herein is a method for object detection, including receiving a reflection magnitude from an infrared sensor during movement of an object relative to the infrared sensor; determining a change of the reflection magnitude; and detecting the object based on comparing the determined change of the received reflection magnitude to a change threshold.

The method may further include determining the change threshold based on a distance threshold.

The method may further include applying a filter to the determined change of the reflection magnitude, wherein the object is detected based on a filtered change.

The method may further include receiving a second reflection magnitude from a second infrared sensor, wherein the infrared sensor and the second infrared sensor are mounted to a platform; determining a second change of the second reflection magnitude; and determining a location of the detected object relative to the object based on the determined change and the second change.

The method may further include determining, based on a path of the object and the determined location of the object, that the object is in the path of the object; and upon determining that the object is in the path of the object, actuating an actuator to stop the object.

Determining of the location of the object is made in a computer associated with the infrared sensor receiving the second reflection magnitude from the infrared sensor.

The method infrared sensor may be mounted to a vehicle seat, and the method may further include actuating a vehicle seat actuator to move the vehicle seat within a vehicle interior compartment, wherein (i) the infrared sensor is mounted to the vehicle seat having a field of view including a path of the vehicle seat and (ii) the vehicle seat actuator is mechanically connected to the vehicle seat.

The method may further include actuating the infrared sensor to transmit infrared light and determine the reflection magnitude based on reflections of the transmitted infrared light.

Further disclosed herein is a computer including a processor and a memory. The memory stores instructions executable by the processor to receive a first reflection magnitude from a first infrared sensor and a second reflection magnitude from a second infrared sensor, during movement of a platform, to which the first and second sensors are attached, relative to an object; to determine a first change of the first reflection magnitude and a second change of the second reflection magnitude; to determine a first distance between the first infrared sensor and the object based on the determined first change and a second distance between the second infrared sensor and the object; and based on (i) the determined first and second distance, (ii) locations of the first and second sensor relative to a reference point of the object, and (iii) a travel path of the object, to determine whether the object is within the travel path of the platform.

Further disclosed is a computing device programmed to execute any of the above method steps.

Yet further disclosed is a computer program product, comprising a computer-readable medium storing instructions executable by a computer processor, to execute any of the above method steps.

System Elements

Figure 1:
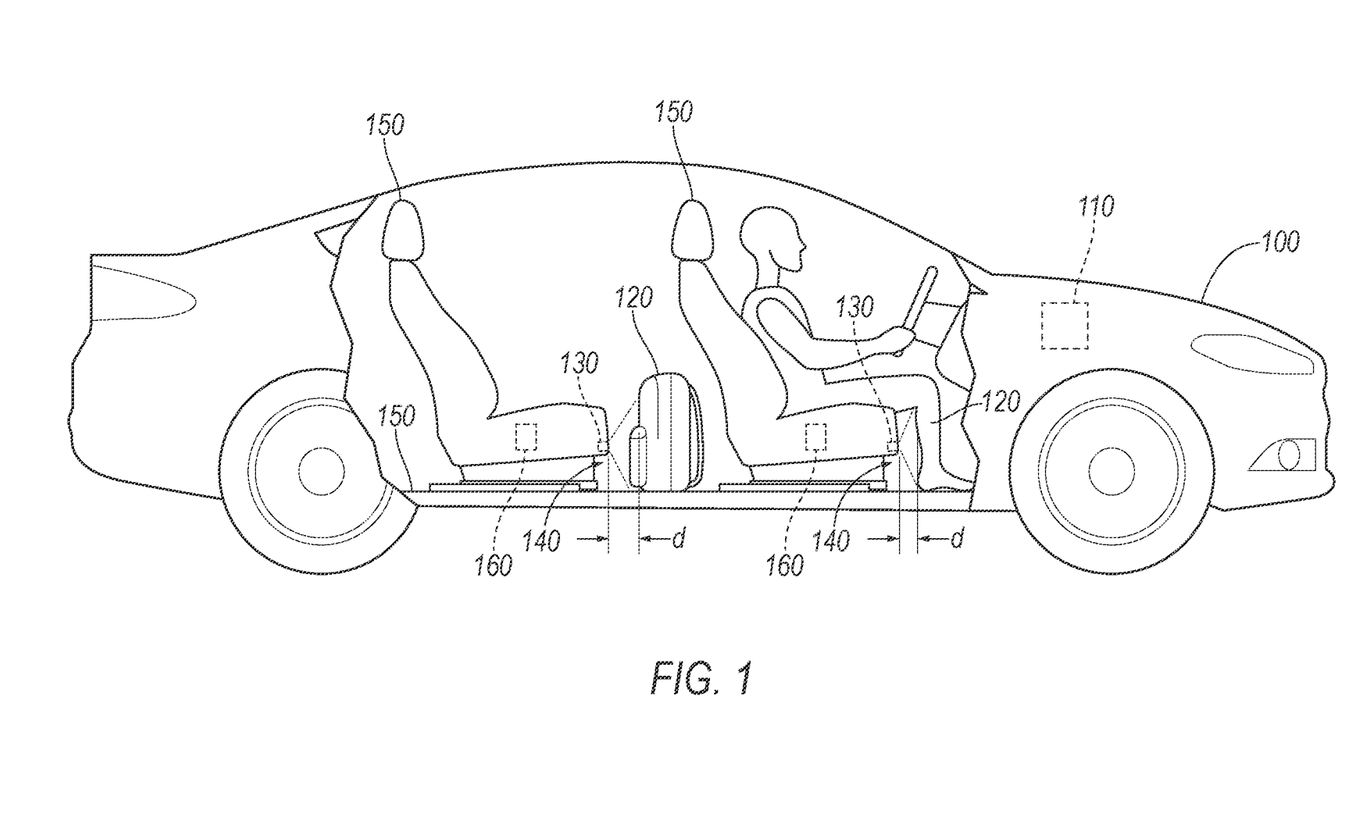
FIG. 1 is a block diagram of an exemplary vehicle.

FIG. 1 illustrates an example vehicle 100 including a computer 110 that is programmed to detect object(s) 120 based on data received from infrared sensor(s) 130 with a field of view 140. An active infrared sensor 130 may be mounted to a moveable platform 150 such as a seat in a vehicle 100 platform 150 in a vehicle 100 interior compartment that is configured to be movable relative to the vehicle cabin floor 170. The platform 150, e.g., the seat, may be movably attached to the vehicle 100 floor 170, e.g., via a linear and/or curved slide, such that the platform 150 may move forward-backward and/or rotate around an axis perpendicular to the vehicle 100 floor 170. The example of the infrared sensor 130 in a vehicle 100 as illustrated in FIG. 1 is a non-limiting example of detecting an object 120 using an active infrared sensor 130 as disclosed herein. In other (non-illustrated) examples, the platform 150 could be a robot arm of a machine, e.g., in a manufacturing plant, and the active infrared sensor 130 could be included in the robot arm for detecting objects nearby, e.g., within 1 meter from the robot arm; alternatively, the platform 150 could be a stationary platform proximate to a conveyor belt system and arranged such that a sensor 130 included in the platform 150 can detect a workpiece on a conveyor belt. Yet further examples are possible within the scope of the present disclosure.

The vehicle 100 may be powered in any suitable manner, e.g., including with an electric motor and/or internal combustion engine. The vehicle 100 includes the computer 110, sensors 130 such as active infrared sensor(s) 130, etc., actuators 160, and other components discussed below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

As already mentioned, generally included in instructions stored in the memory and executed by the computer 110 is programming for operating one or more vehicle components, e.g., braking, steering, propulsion, etc., without intervention of a human operator. Using data received in the computer 110 from sensors such as the infrared sensor 130, the computer 110 may make various determinations and/or control various vehicle components and/or operations without a driver input.

An object 120, in the present context, is any physical mass or body having a surface that reflects infrared light, e.g., a box, a backpack, a surface of a human or animal body, etc. As mentioned above, a magnitude of reflection of infrared light from an object 120 surface is in part based on reflectivity of the object 120 surface. Reflectivity (or reflectance) of a surface of a material is its effectiveness in reflecting radiant energy. Reflectivity is typically specified as a fraction, e.g., percentage, of incident electromagnetic power that is reflected by the surface. The reflection magnitude, in the present context, may be specified, e.g., in a range of 0 (zero) for no detection to 10,000 for full intensity detection, for example. Thus, a reflection magnitude of an object 120 surface is at least in part based on the reflectivity of the surface. Additionally or alternatively, a reflection magnitude can be specified in candela (cd) units.

The vehicle 100 may include one or more infrared sensors 130. An infrared sensor 130 is an electronic sensor that measures infrared light radiating from a surface, e.g., of an object 120, in the sensor 130 field of view 140. The data may be received by the computer 110 as analog and/or digital data. An active infrared sensor 130 typically includes an infrared transmitter which generates infrared light to illuminate the field of view 140 of the sensor 130. An infrared light emitter may include one or more infrared Light Emitting Diode (LED).

Figure 2:
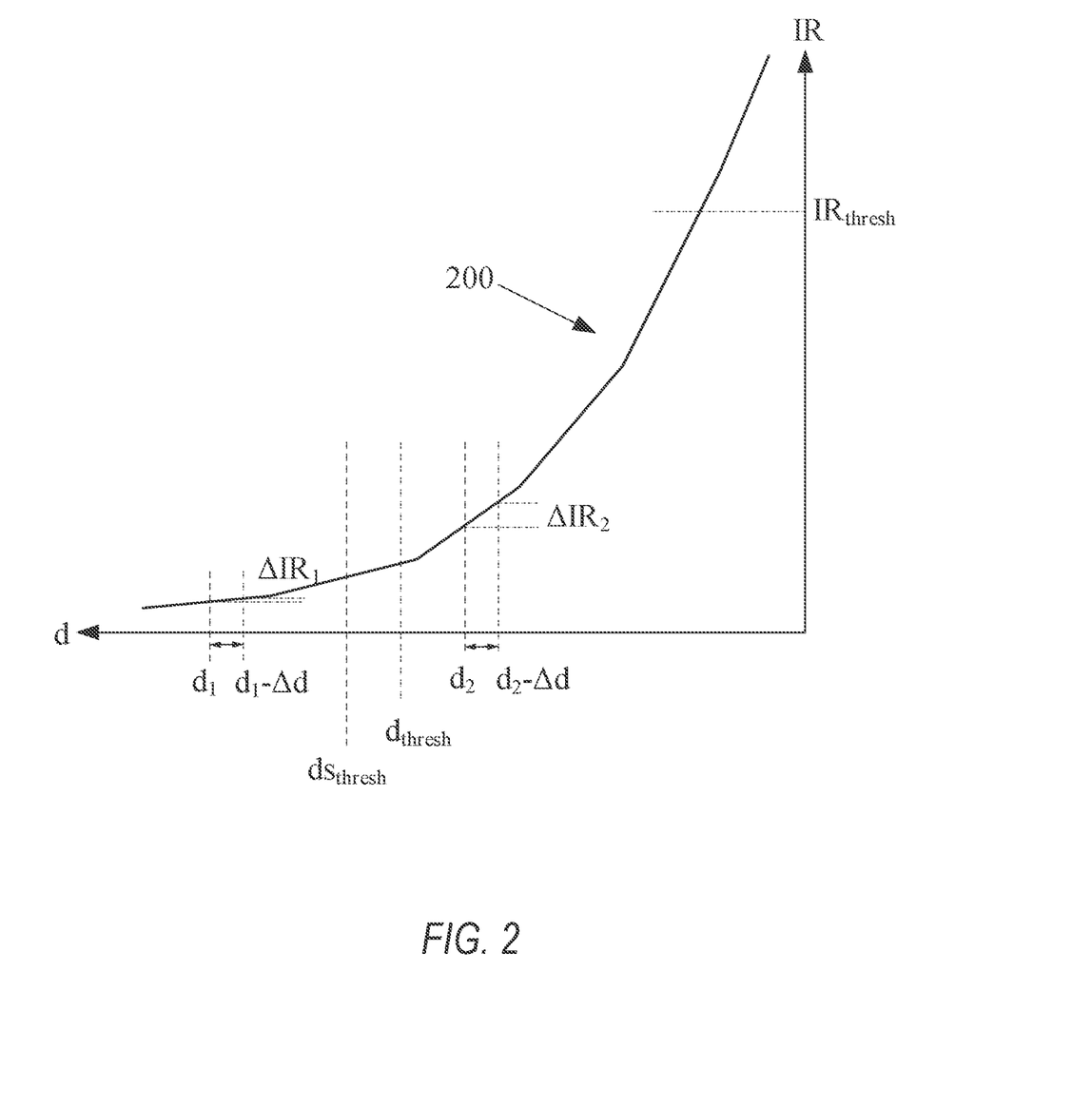
FIG. 2 is a graph showing threshold of reflection magnitude based on distance from an object.

Now referring to FIGS. 1 and 2, the computer 110 may be programmed to actuate the active infrared sensor 130 to transmit infrared light and determine the reflection magnitude IR based on reflections of the transmitted infrared light. The computer 110 may be programmed to filter out a reflection magnitude IR of received infrared light with a wavelength different from a specified transmitted infrared light wavelength. In one example, the computer 110 may be programmed to filter out reflections of infrared light with wavelength different from the transmitted light wavelength. For example, the computer 110 may be programmed to ignore received infrared light having a wavelength with a difference from the transmitted wavelength that exceeds a predetermined threshold difference, e.g., 3 nanometers (nm). Thus, advantageously, the computer 110 can ignore infrared light received from other sources of infrared light. The threshold difference may be determined using empirical techniques, e.g., by actuating other infrared sources to generate infrared light to the field of view 140 while turning off (or not activating) an infrared transmitter of the sensor 130 and adjusting the threshold such that at least 99% of reflections caused by the other infrared sources are ignored.

The computer 110 can be programmed to receive a reflection magnitude IR from an active infrared sensor 130 during a movement of an object 120 relative to the infrared sensor 130, to determine a change $\Delta IR$ of the reflection magnitude IR, and to detect an object 120 based on comparing the determined change $\Delta IR$ of the received reflection magnitude IR to a change threshold $\Delta IR_{thresh}$. The computer 110 may be programmed to receive a request for moving the object from a human-machine interface, e.g., a button, a knob, a touchscreen, an audio command, a message from a second computer, etc. In one example, the received request may specify a request to move forward, backward, and/or sideway, or rotate the platform 150.

In one example, the computer 110 may be programmed to determine the reflection magnitude IR by sampling with a specified cycle time, e.g., 100 milliseconds (ms). Sampling, in the present context, means measuring the reflection magnitude IR in equal time intervals based on a specified cycle time. For example, $IR_n$ may represent a most recent measured value of reflection magnitude, whereas $IR_{n-1}$ may represent the last value measured before the most recent value, e.g., 100 ms prior to the magnitude $IR_n$.

With reference to Equation (1) below, the computer 110 may be programmed to determine the change $\Delta IR$. As discussed above, a distance d between the sensor 130 and the object 120 can change, e.g., due to actuating the platform 150 actuator 160 to move the platform 150 forward and/or backward (e.g., in the illustrated example, to move a vehicle seat, or, in another example not illustrated in the present figures, moving a robot arm). Based on a speed of platform 150 movement, the computer 110 may determine a change of distance $\Delta d$ between two consecutive measurements of the reflection magnitude $IR_n$, $IR_{n-1}$, e.g., using data received from a speed sensor 130 and/or displacement sensor 130 mechanically connected to the platform 150. Thus, a change $\Delta IR$ at an $n^{th}$ time of measurement is specified as a change of reflection magnitude IR upon a change of distance $\Delta d$, e.g., 5 cm, between the sensor 130 and the object 120.

$$\Delta IR_n = IR_n - IR_{n-1} \qquad (1)$$

Because the change of distance $\Delta d$ is dependent on speed of movement of the platform 150, a time difference between two consecutive measurements of reflection magnitude corresponding to change of distance $\Delta d$ can be determined based on the object speed. For example, if the platform 150 moves 5 cm/s, then to calculate $\Delta IR_n$ for a $\Delta d$ of 1 cm, the computer 110 may be programmed to sample the reflection magnitude IR with a cycle time of 200 milliseconds (ms). Thus, a time between measured magnitudes $IR_n$, $IR_{n-1}$ is 200 ms.

The change of reflection magnitude $\Delta IR$ versus a distanced from an infrared sensor 130 to an object 120 is non-linear, e.g., exponential. Thus, as disused below, while the distance d changes, e.g., by actuating a platform 150 actuator 160 to move the platform 150, a distance d to an object 120 may be determined based on the determined change $\Delta IR$.

Typically, if an object 120 is very near a non-moving platform 150, e.g., within 5 cm, it may be desirable to prevent movement of the platform 150. As discussed above, the computer 110 may be programmed to determine a distance d to an object 120 when the platform 150, is moving. Additionally, to prevent initiating movement of the platform 150, the computer 110 may be programmed to store a reflection magnitude threshold $IR_{thresh}$, e.g., 8000, and prevent a start of movement of the platform 150, e.g., by declining a request received from a user (e.g., selecting a button or the like to move a vehicle seat) to move the platform 150 toward the object 120. The magnitude threshold $IR_{thresh}$ may be determined using empirical techniques, e.g., by measuring reflection magnitudes of objects 120 within 5 cm from the object with various reflectivity levels and selecting a value that would work for different type of materials likely to be detected by a sensor 130 in the tested environment (e.g., materials likely to be detected in a vehicle, such as a human body surface, materials for clothes and bags, etc.).

With reference to FIG. 2, an example graph 200 illustrates a reflection magnitude IR (vertical or y-axis) that varies based on a distance d (horizontal or x-axis) from an infrared sensor 130 to a reflecting surface, e.g., of an object 120. For example, a first change of distance $\Delta d$, from a distance $d_1$ to a distance $d_1 - \Delta d$, results in a change of magnitude $\Delta IR_1$, whereas a second change of distance $\Delta d$ from a distance $d_2$ to a distance $d_2 - \Delta d$ results is a change of magnitude $\Delta IR_2$, which is greater than $\Delta IR_n$.

The computer 110 may be programmed to detect an object 120 at a distance d based on the detected change of reflection magnitude $\Delta IR$. For example, the computer 110 may store data including the change of magnitude $\Delta IR$ based on the distance d, e.g., as shown in graph 200. The computer 110 may be programmed to determine a change of distance $\Delta d$ based on a specified speed of sensor 130 movement (e.g., the computer 110 may store a specified speed such as a speed at which a vehicle seat is known to move, e.g., 5 cm/sec, in a computer 110 memory) and/or data from a speed sensor 130, and then determine a distance d from an object 120 upon determining a change $\Delta IR$. For example, based on a speed of 5 cm/sec, for a sampling rate of 200 ms, a change of distance $\Delta d$ is 1 cm.

As seen in FIG. 2, the change $\Delta IR$ increases as a distance d to an object 120 decreases. In one example, the computer 110 may be programmed to detect an object 120 upon determining that the determined change $\Delta IR$ exceeds a threshold $\Delta IR_{thresh}$. In other words, the computer 110 may be programmed to detect an object 120 upon determining that a distance d from a surface is less than a distance threshold, e.g., 20 cm. In one example, the threshold $\Delta IR_{thresh}$ may be determined based on the distance threshold $d_{thresh}$ and the stored data specifying change $\Delta IR$ versus distance d. A change of reflection magnitude corresponds to a distanced between the sensor 130 mounted to the object and the object 120. Thus, the computer 110 may be programmed to determine the $\Delta IR_{thresh}$ based on a specified distance threshold $d_{thresh}$, e.g., 20 cm.

The computer 110 may be programmed to determine that a movement of the platform 150, is obstructed and the movement should stop when the distance d to the object 120 is less than the distance threshold $d_{thresh}$. In another example, the computer 110 may store a deceleration distance threshold $ds_{thresh}$, e.g., 30 cm, that is greater than the distance threshold $d_{thresh}$ at which movement of the platform 150 is to be slowed, i.e., decelerated resulting in the platform 150 slowing down, i.e., moving more slowly than before. With reference to FIG. 2, based on the deceleration distance threshold $ds_{thresh}$, a deceleration change threshold $\Delta IRs_{thresh}$ may be specified.

Table 1 shows an example set of rules or criteria for actuating the platform 150. The computer 110 may be programmed to actuate the platform 150 to move at a specified speed, e.g., 5 cm/sec, upon determining that a distance d to the object is greater than the deceleration distance threshold $ds_{thresh}$. The computer 110 may be programmed to reduce the speed of the platform 150, e.g., based on a specified multiplier in a range of 0.1 to 0.9, upon determining that the distance d is less than the deceleration distance threshold $ds_{thresh}$ but greater than the distance threshold $d_{thresh}$. For example, based on a multiplier of 0.5 stored in the computer 110 memory, the computer 110 may reduce the platform 150 speed to half of the specified speed of the platform upon determining that a distance d to the object 120 is less than the distance threshold $ds_{thresh}$. The distance threshold $ds_{thresh}$ may be selected based on empirical techniques, e.g., with an objective of providing a comfortable experience for a user. The computer 110 may be programmed to actuate the actuator 160 to stop the platform 150 upon determining that the distance d is less than the distance threshold $d_{thresh}$.

TABLE 1

| Distance d | Action |
| --- | --- |
| d > $ds_{thresh}$ | Actuate the platform to move at specified speed |
| d < $ds_{thresh}$ and d > $d_{thresh}$ | Actuate the platform to move at a reduced speed, e.g., multiplier such as 0.5*specified speed. |
| d < $d_{thresh}$ | Stop platform |

The computer 110 may be programmed to apply a filter to the determined change of the reflection magnitude $\Delta IR$. The object 120 may be detected based on a filtered change $f(\Delta IR)$. For example, the computer 110 may be programmed to implement Equation (2) below to determine a filtered change $f(\Delta IR)$ by determining a moving average of the last m measurements of IR. Additionally or alternatively, as a filtering technique, as discussed below with respect to FIG. 5, the computer 110 may be programmed to compare the unfiltered reflection mechanism to a threshold resulting in a logical output, e.g., 0 (not exceeding a threshold) or 1 (exceeding threshold), and then apply a filter to the logical output.

$$f(\Delta IR_n) = \frac{\Delta IR_n + \Delta IR_{n-1} + \ldots + \Delta IR_{n-m}}{m+1} \quad (2)$$

Figure 3:
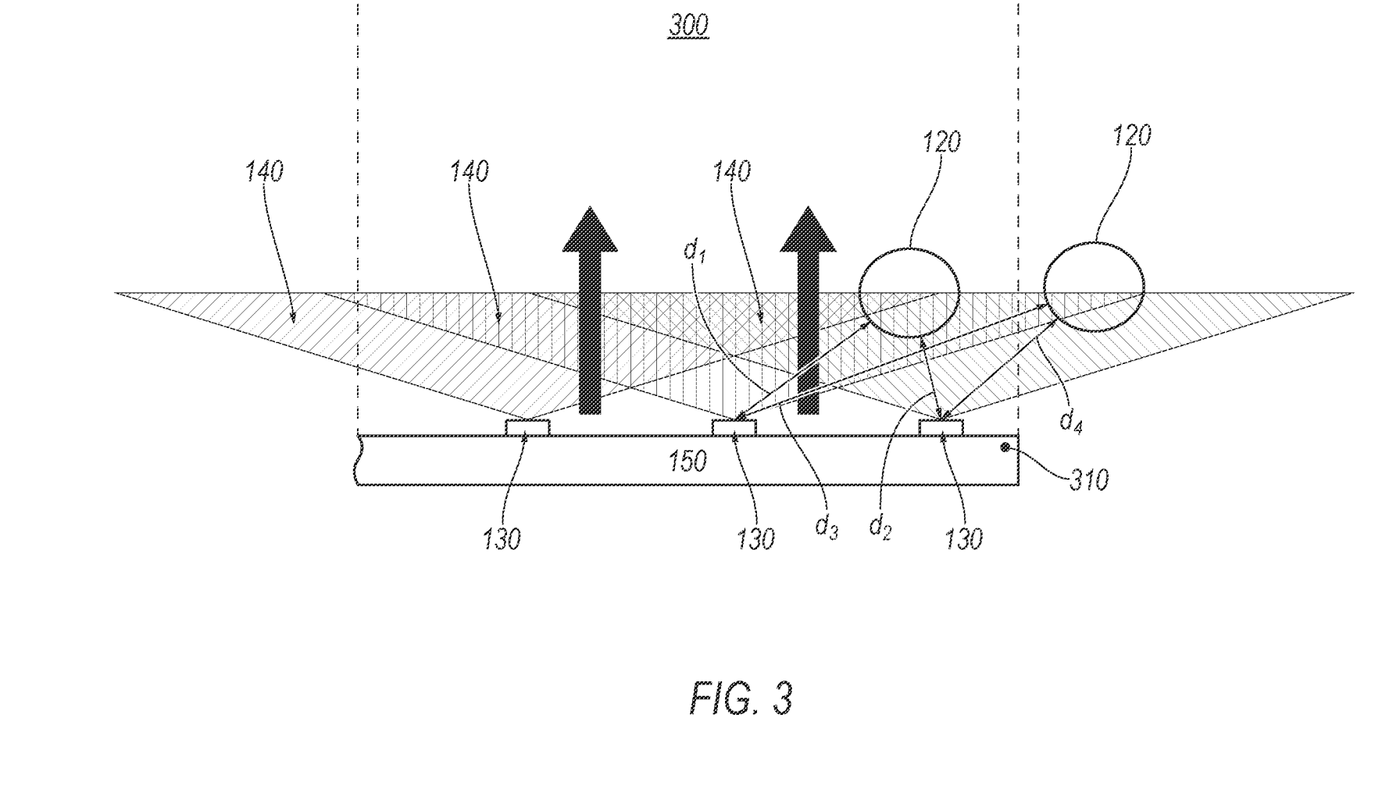
FIG. 3 shows a seat of the vehicle of FIG. 1 with multiple infrared sensors for detecting objects.

FIG. 3 shows an example travel path 300 of a moving platform 150. For example, a platform 150 such as a seat in a vehicle 100 that is mechanically and movably attached to a vehicle 100 floor 170 may move on a straight or curved path 300 and/or rotate around an axis at angle, e.g., perpendicular, to the vehicle 100 floor 170. An active infrared sensor 130 can be mounted to the platform 150 having a field of view 140 including a path 300 of the platform 150. The computer 110 may be programmed to store data specifying the path 300 of a platform 150. For example, the computer 110 may store location coordinates of a perimeter of a rectangularly shaped area or circular shaped area of the vehicle 100 floor 170 in which the platform 150 moves when moving backward or forward, or rotating, for example. For example, a width of the path 300 may correspond to a platform 150 (e.g., vehicle seat) width and a length of the path 300 may correspond to a length on a slide that mechanically and movably attaches the platform 150 to the floor 170. The location coordinates of the path 300 perimeter may be 2D (two dimensional) coordinates specified with respect to a two-dimensional Cartesian coordinates system with an origin in the vehicle 100, e.g., an intersection of a vehicle 100 longitudinal axis and a vehicle 100 lateral axis.

The computer 110 may be programmed to determine, based on (i) the path 300 of the platform 150, and (ii) the determined location of an object 120, that the object 120 is in the path 300 of the platform 150, and upon determining that the object 120 is in the path 300 of the platform 150, actuate an actuator 160 to stop the platform 150.

Determining whether a detected object 120 is in the path 300 or outside the path 300 advantageously allows the computer 110 to be programmed to actuate the actuator 160 to stop only upon determining that the detected object 120 is in the path 300. Although the present system could include a platform 150 with only one sensor 130, in one example, seen in FIG. 3, multiple infrared sensors 130 may be mounted to a platform 150, e.g., a seat in a vehicle 100. The fields of view 140 of the sensors 130 may overlap. In some examples, an object 120 may therefore be within more than one field of view 140, thus, being detected by multiple sensors 130.

The computer 110 may be programmed to receive a first reflection magnitude $IR_a$ from a first active infrared sensor 130 and a second reflection magnitude $IR_b$ from a second active infrared sensor 130. As discussed below, the computer 110 may be programmed to determine a first change of reflection magnitude $\Delta IR_a$ based on the received reflection magnitudes $IR_a$, and a second change of reflection magnitude $\Delta IR_b$ based on the received reflection magnitudes $IR_b$, to determine a location of the detected object 120 relative to the platform 150.

The computer 110 may be programmed to determine that a first object 120 with determined distances $d_1$, $d_2$ from the sensors 130 in the path 300, and to determine that a second object with distances $d_3$, $d_4$ from the sensor 130 is outside the path 300. As discussed further below, the computer 110 may be programmed to determine, based on the determined distances $d_1$, $d_2$, $d_3$, $d_4$, whether an object 120 is in or outside the path 300 of the platform 150.

In one example, the computer 110 may be programmed to determine location coordinates of one or more sensors 130 based on (i) relative location of the sensor(s) 130 to stored location of a platform 150 reference point 310, and (ii) motion data of the platform 150, e.g., data from a motion sensor 130 coupled to the platform 150 actuator 160 for measuring a motion of the platform 150 along the path 300, e.g., in centimeters, relative to a vehicle 100 reference point. The computer 110 may be programmed using trigonometric techniques to determine the location of the objects 120 based on (i) the determined location of the first and second sensor 130, and (ii) the distances $d_1$, $d_2$, $d_3$, $d_4$.

As discussed above, the computer 110 may be programmed to receive data from multiple infrared sensors 130. For example, a first and a second infrared sensor 130 may be mounted to a platform 150. A computer 110 may be programmed to receive data describing a reflection magnitude received in a first infrared sensor 130 from a second infrared sensor and to then determine the location of the object 120 relative to the platform. For example, a computer 110 could be a programmable computer located inside an enclosure of the first infrared sensor 130 and programmed to receive reflection magnitude IR data from a second infrared sensor 130 and determine the location of the object 120 relative to the platform 150. In one example, a programmable processor of a first infrared sensor 130 receives, in addition to reflection magnitude data received from an infrared receiver included in the first infrared sensor 130, reflection magnitude data from a plurality of other infrared sensors 130 and determine a location of an object 120 based on data from the first sensor 130 receiver and data form the plurality of other sensors 130, and to output data, e.g., to a vehicle 100 computer 110, including a location of the object 120.

The computer 110 may determine the distance d while the distance d is changing, i.e., during movement of the platform 150 and/or a detected object 120. In one example, the computer 110 may be programmed to activate the infrared sensor 130 upon actuating an actuator 160 to move the platform 150, a robot arm, etc.

The computer 110 may be programmed to receive data from multiple infrared sensors 130 and to then determine whether one of the multiple sensors 130 is faulty based on the received data, e.g., by comparing output of sensors 130 having common or overlapping fields of view 140. For example, if, within an overlapping field of view 140 of three sensors 130, a first and second sensor 130 detect an object 120 and a third sensor 130 does not detect an object 120, the computer 110 may determine that the third sensor 130 is faulty. In another example, the computer 110 may determine that a third sensor 130 is faulty upon determining that an output reflection magnitude IR of the sensor 130 does not change while outputs of other sensors 130 mounted to the same moving object are changing.

Figure 4A:
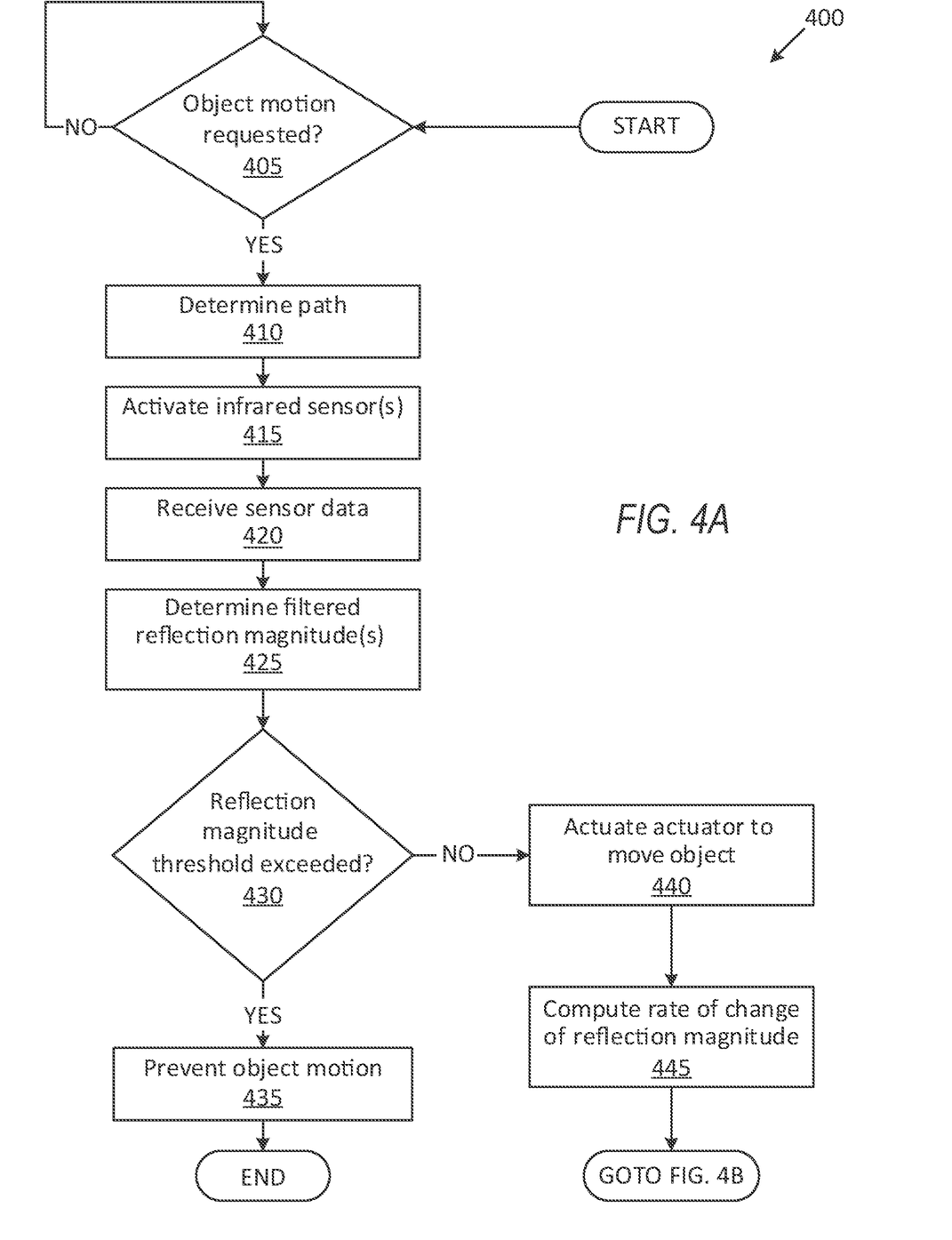
FIGS. 4A-4B is a flowchart of an exemplary process for controlling a movement of the vehicle seat.
Figure 4B:
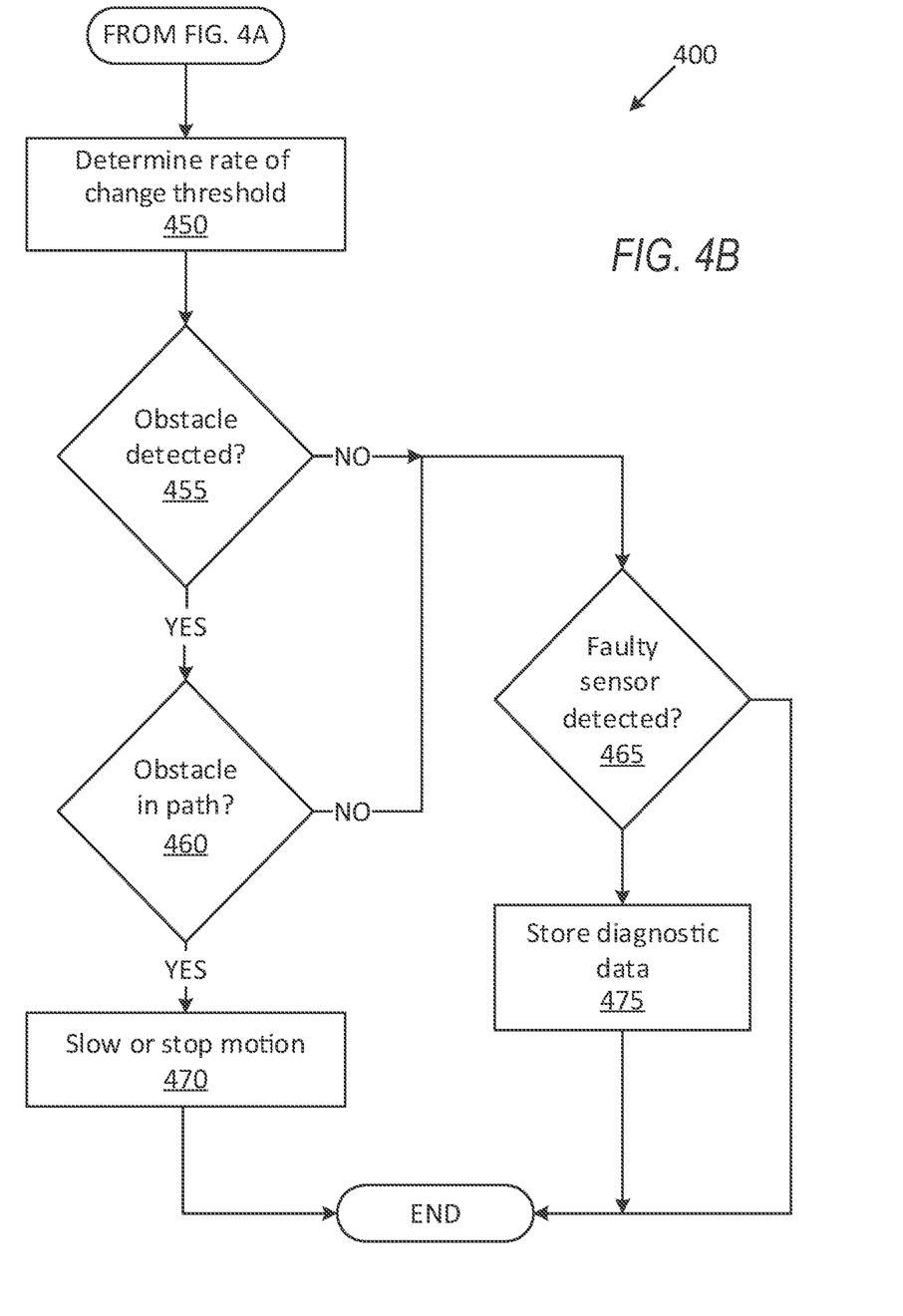

FIGS. 4A-4B is a flowchart of an exemplary process 400 for controlling a movement of the vehicle 100 platform 150. The vehicle 100 computer 110 may be programmed to execute blocks of the process 400. Additionally or alternatively, a computer associated with an infrared sensor 130, e.g., within a housing of the respective sensor 130, may be programmed to execute blocks of the process 400.

Turning to FIG. 4A, the process 400 begins in a decision block 405, in which the computer 110 determines whether a request for moving a platform 150 (FIG. 1), is received. If the computer 110 determines that a request for moving the platform 150, is received, then the process 400 proceeds to a block 410; otherwise the process 400 returns to the decision block 405.

In the block 410, the computer 110 determines a path 300 for the moving object based on the received request and other data. For example, the path 300 could be determined based on the request and data stored in the computer 110 memory, e.g., specifying a rectangular-shaped path 300 for a forward and/or backward movement, a curved path 300 for a rotating platform 150, etc. The process 400 then proceeds to a block 415.

In the block 415, the computer 110 activates the infrared sensor(s) 130. The computer 110 may be programmed to activate the infrared sensor 130 by, e.g., activating a power supply to the sensors 130, activating an enable input of the sensors 130, etc. In one example, the computer 110 may be programmed to identify the sensors 130 for activation based on the received request for movement. The computer 110 may be programmed (i) to activate one or more sensors 130 having a field of view 140 including a forward movement path 300 based on a request for forward movement of the platform 150, and (ii) to activate one or more sensors 130 having a field of view 140 including a backward movement path 300 based on a request for backward movement of the platform 150.

Next, in a block 420, the computer 110 receives reflection magnitude IR data from the infrared sensor(s) 130. For example, as shown in FIG. 3, the computer 110 may receive data from multiple infrared sensors 130 mounted to a platform, e.g., a vehicle 100 seat, with fields of view 140 including a path 300 of the platform 150.

Next, in a block 425, the computer 110 determines a filtered reflection magnitude f(IR) from the reflection magnitude data received in the block 420. In one example, the computer 110 may be programmed to implement a moving average, e.g., Equation (2), to determine filtered reflection magnitude f(IR). In another example, a different filtering technique may be used, e.g., a low pass filter. Alternatively, the block 425 can be omitted, thus, unfiltered reflection magnitude may be used in the following blocks.

Next, in a decision block 430, the computer 110 determines whether the determined filtered reflection magnitude f(IR), exceeds a reflection magnitude threshold $IR_{thresh}$, e.g., 8000. If the computer 110 determines that the reflection magnitude IR exceeds the threshold $IR_{thresh}$, then the computer 110 proceeds to a block 430; otherwise the process 400 proceeds to a block 440.

In the block 430, the computer 110 prevents a motion of the platform 150. For example, the computer 110 may be programmed to decline a received request for moving the platform 150 and to prevent or stop an actuation of an actuator 160 which moves the platform 150. Following the block 430, the process 400 ends, or alternatively returns to the decision block 410, although not shown in FIG. 4A.

In the block 440, the computer 110 actuates an actuator 160 to move the platform 150, a robot arm, etc. The computer 110 may be programmed to actuate the platform 150 actuator 160 to move the platform 150 along a path 300 based on the received request, e.g., forward, backward, sideways, and/or along a curved or rotational path, etc. Alternatively, the computer 110 may output object 120 data, e.g., location data, to a second computer, e.g., in the vehicle 100, programmed to actuate the actuator 160 based on the received object 120 data.

Next, in a block 445, the computer 110 computes the change of reflection magnitude ΔIR. The computer 110 may be programmed to determine the change of reflection magnitude ΔIR based on the object speed and specified change of distance Δd, as discussed above with respect to Equation (1).

Next, and turning to FIG. 4B, in a block 450, the computer 110 determines the change threshold $\Delta IR_{thresh}$ corresponding to the stored distance threshold $d_{thresh}$, as discussed with respect to FIG. 3. The computer 110 may additionally determine a second change threshold $\Delta IRS_{thresh}$ for initiating deceleration of platform 150 movement.

As discussed with respect to FIG. 3, a change of reflection magnitude corresponds to a distance d between the sensor 130 mounted to the platform 150 and the object 120. Thus, the computer 110 may be programmed to determine the $\Delta IR_{thresh}$ based on a specified distance threshold $d_{thresh}$, e.g., 20 cm. The computer 110 may be programmed to determine that a movement of the platform 150, is obstructed and the movement should stop when the distance d to the object 120 is less than the distance threshold $d_{thresh}$. In another example, the computer 110 may store a second distance threshold $ds_{thresh}$, e.g., 30 cm, that is greater than the distance threshold $d_{thresh}$ for slowing movement of the platform 150.

Next, in a decision block 455, the computer 110 determines whether an object 120 is detected by one or more sensors 130 on the platform 150. The computer 110 may be programmed to determine that an object 120 is detected upon determining that a change of magnitude $\Delta IR$ exceeds the threshold $\Delta IR_{thresh}$. Additionally or alternatively, the computer 110 may be programmed to determine that an object 120 is detected upon determining that the determined change of magnitude $\Delta IR$ exceeds the deceleration threshold $\Delta IRS_{thresh}$. If the computer 110 determines that an object 120 is detected, then the process 400 proceeds to a decision block 460; otherwise the process 400 proceeds to a decision block 465.

In the decision block 460, the computer 110 determines whether the detected object 120 is in a path 300 of the platform 150, e.g., as discussed above with respect to FIG. 3. If the computer 110 determines that the object 120 is in the path 300 of movement of the platform 150, then the process 400 proceeds to a decision block 470; otherwise the process 400 proceeds to the decision block 465.

In the decision block 465, which can be reached from the blocks 455, 460, the computer 110 determines whether a faulty sensor 130 is detected. If the computer 110 determines that a sensor 130 is faulty, then the process 400 proceeds to a block 475; otherwise the process 400 ends, or alternatively returns to the block 410, although not shown in FIGS. 4A-4B.

In the block 470, which can follow the block 460, the computer 110 actuates the actuator 160 to slow or stop movement of the platform 150. The computer 110 may be programmed to actuate the actuator 160 to slow, e.g., reducing the speed to a speed less than a threshold such as 1 cm/s, upon determining that the change of reflection magnitude $\Delta IR$ exceeds the second threshold $\Delta IRS_{thresh}$, but is less than the threshold $\Delta IR_{thresh}$. The computer 110 may be programmed to actuate the actuator 160 to stop the movement of the object if the change of reflection magnitude $\Delta IR$ exceeds the threshold $\Delta IR_{thresh}$. Following the block 470, the process 400 ends, or alternatively returns to the block 410, although not shown in FIGS. 4A-4B.

In the block 475, the computer 110 stores diagnostic data in a computer 110 memory. For example, the computer 110 may be programed to store an identifier of the faulty infrared sensor 130. An identifier may be numerical data specifying, e.g., sensor 130 at the right corner of the front right platform 150. Following the block 475, the process 400 ends, or alternatively returns to the block 410, although not shown in FIGS. 4A-4B.

Figure 5:
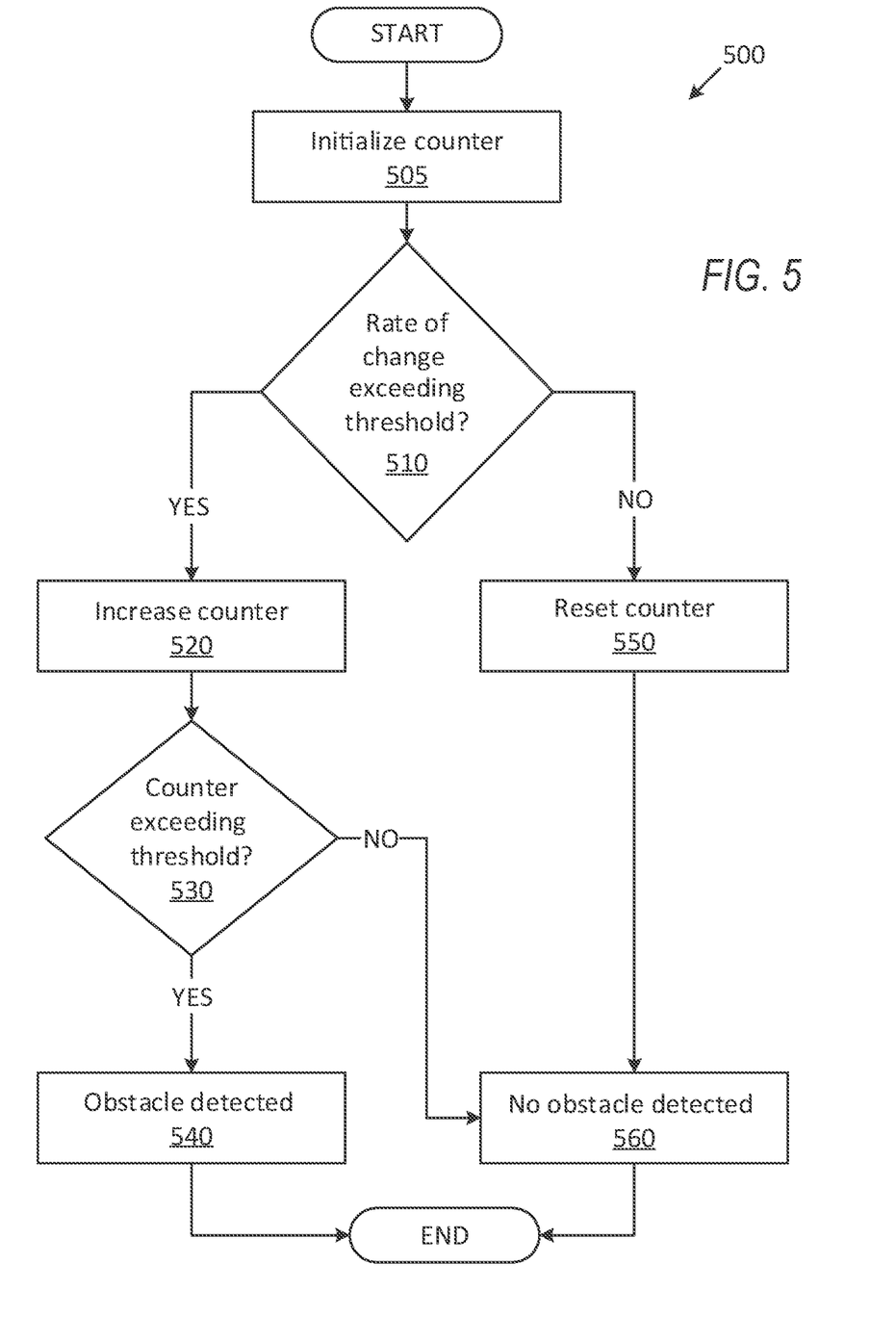
FIG. 5 is a flowchart of an exemplary process for detecting an object.

FIG. 5 is a flowchart of an example process 500 for determining whether an object 120 is detected. The process 500 illustrates a non-limiting example implementation of the block 455 of the process 400. The computer 110 may be programmed to execute blocks of the process 500.

The process 500 begins in a block 505, in which the computer 110 initializes a counter, e.g., to 0 (zero).

Next, in a decision block 510, the computer 110 determines whether the change of reflection magnitude $\Delta IR$ exceeds a threshold $\Delta IR_{thresh}$. If the computer 110 determines that the change of reflection magnitude $\Delta IR$ exceeds the threshold $\Delta IR_{thresh}$, then the process 500 proceeds to a block 520, otherwise the process 500 proceeds to a block 550.

In the block 520, the computer 110 increments a counter, e.g., by adding 1 (one) to a current counter value.

Next, in a decision block 530, the computer 110 determines whether the counter value exceeds a threshold, e.g., 3. If the computer 110 determines that the counter value exceeds the threshold, then the process 500 proceeds to a block 540; otherwise the process 500 proceeds to a block 560.

In the block 540, the computer 110 determines that an object 120 is detected. In other words, if a number of times the change of reflection magnitude $\Delta IR$ exceeds a threshold $\Delta IR_{thresh}$, exceeds the counter threshold, the computer 110 determines that the object 120 is detected. This technique is an example debouncing or filtering technique to suppress noise and avoid incorrect or incorrectly missed object detections.

In the block 550, the computer 110 resets the counter, i.e., changes the counter value to a predetermined initial value, e.g., 0 (zero).

In the block 560, which can be reached from each of the blocks 530, 550, the computer 110 determines that no object is detected.

Following each of the blocks 540, 560, the process 500 ends, or alternatively returns to the decision block 510, although not shown in FIG. 5.

Unless indicated explicitly to the contrary, "based on" means "based at least in part on" and/or "based entirely on."

Computing devices as discussed herein generally each includes instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computing device is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, nonvolatile media, volatile media, etc. Nonvolatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CDROM, DVD, any other optical medium, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a nonprovisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer including a processor and a memory, the memory storing instructions executable by the processor to:
   receive a reflection magnitude from an infrared sensor during a movement of an object relative to the infrared sensor;
   determine a change of the reflection magnitude over distances of the infrared sensor from the object;
   determine a change threshold based on a distance threshold; and
   detect the object based on comparing the determined change of the reflection magnitude to the change threshold.

2. The system of claim 1, wherein the instructions further include instructions to detect the object upon determining that the determined change exceeds the threshold.

3. The system of claim 1, wherein the instructions further include instructions to apply a filter to the determined change of the reflection magnitude, wherein the object is detected based on a filtered change.

4. The system of claim 1, wherein the instructions further include instructions to:
   receive a second reflection magnitude from a second infrared sensor, wherein the infrared sensor and the second infrared sensor are mounted to a platform;
   determine a second change of the second reflection magnitude; and
   determine a location of the detected object relative to the platform based on the determined change and the second change.

5. The system of claim 4, wherein a second computer associated with the infrared sensor is programmed to receive the second reflection magnitude from the infrared sensor and determine the location of the object relative to the platform.

6. The system of claim 1, wherein the instructions further include instructions to:
   determine, based on a path of a platform and the determined location of the object, that the object is in the path of the platform, wherein the infrared sensor is mounted to the platform and wherein a field of view of the infrared sensor at least in part includes the path of the platform; and
   upon determining that the object is in the path of the platform, actuate an actuator to stop the platform.

7. The system of claim 1, wherein the instructions further include instructions to actuate a vehicle seat actuator to move a vehicle seat within a vehicle interior compartment, wherein (i) the infrared sensor is mounted to the vehicle seat having a field of view including a path of the vehicle seat and (ii) the vehicle seat actuator is mechanically connected to the vehicle seat.

8. The system of claim 1, wherein the instructions further include instructions to actuate the infrared sensor to transmit infrared light and determine the reflection magnitude based on reflections of the transmitted infrared light.

9. The system of claim 1, wherein the infrared sensor is mounted to a platform, and the instructions further include instructions to activate the infrared sensor upon actuating an actuator to move the platform.

10. The system of claim 1, wherein the instructions further include instructions to:
    determine a distance of the infrared sensor to the object based on the determined change of the received reflection magnitude;
    actuate an actuator to move a platform with a first speed upon determining that the distance is greater than a deceleration distance threshold;
    actuate the actuator to move the platform with a second speed less than the first speed upon determining that the distance is less than the deceleration distance threshold and greater than a distance threshold; and
    actuate the actuator to stop the platform upon determining that the distance is less than the distance threshold.

11. A method for object detection, comprising:
    receiving a reflection magnitude from an infrared sensor during movement of an object relative to the infrared sensor;
    determining a change of the reflection magnitude;
    determining a change threshold based on a distance threshold; and
    detecting the object based on comparing the determined change of the received reflection magnitude to the change threshold.

12. The method of claim 11, further comprising applying a filter to the determined change of the reflection magnitude, wherein the object is detected based on a filtered change.

13. The method of claim 11, further comprising:
    receiving a second reflection magnitude from a second infrared sensor, wherein the infrared sensor and the second infrared sensor are mounted to a platform;
    determining a second change of the second reflection magnitude; and
    determining a location of the detected object relative to the object based on the determined change and the second change.

14. The method of claim 13, further comprising:
    determining, based on a path of the object and the determined location of the object, that the object is in the path of the object; and
    upon determining that the object is in the path of the object, actuating an actuator to stop the object.

15. The method of claim 13, wherein determining the location of the object is made in a computer associated with the infrared sensor receiving the second reflection magnitude from the infrared sensor.

16. The method of claim 11, wherein the infrared sensor is mounted to a vehicle seat, the method further comprising actuating a vehicle seat actuator to move the vehicle seat within a vehicle interior compartment, wherein (i) the infrared sensor is mounted to the vehicle seat having a field of view including a path of the vehicle seat and (ii) the vehicle seat actuator is mechanically connected to the vehicle seat.

17. The method of claim 11, further comprising actuating the infrared sensor to transmit infrared light and determine the reflection magnitude based on reflections of the transmitted infrared light.

18. A computer comprising a processor and a memory, the memory storing instructions executable by the processor to:
- receive a first reflection magnitude from a first infrared sensor and a second reflection magnitude from a second infrared sensor, during movement of a platform, to which the first and second sensors are attached, relative to an object;
- determine a first change of the first reflection magnitude and a second change of the second reflection magnitude;
- determine a first distance between the first infrared sensor and the object based on the determined first change and a second distance between the second infrared sensor and the object; and
- based on (i) the determined first and second distance, (ii) locations of the first and second sensor relative to a reference point of the platform, and (iii) a travel path of the platform, determine whether the object is within the travel path of the platform.

\* \* \* \* \*